US 9,360,629 B2

(12) United States Patent
Watanabe et al.

(10) Patent No.: US 9,360,629 B2
(45) Date of Patent: Jun. 7, 2016

(54) WAVEGUIDE TYPE OPTICAL SWITCH

(75) Inventors: Toshio Watanabe, Atsugi (JP); Kenya Suzuki, Atsugi (JP); Takashi Goh, Atsugi (JP); Hiroshi Yamazaki, Atsugi (JP); Atsushi Mori, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 336 days.

(21) Appl. No.: 13/984,282

(22) PCT Filed: Feb. 14, 2012

(86) PCT No.: PCT/JP2012/000970
§ 371 (c)(1),
(2), (4) Date: Aug. 7, 2013

(87) PCT Pub. No.: WO2012/111316
PCT Pub. Date: Aug. 23, 2012

(65) Prior Publication Data
US 2013/0322815 A1 Dec. 5, 2013

(30) Foreign Application Priority Data

Feb. 15, 2011 (JP) .................. 2011-029919

(51) Int. Cl.
*G02B 6/35* (2006.01)
*G02F 1/313* (2006.01)
(Continued)

(52) U.S. Cl.
CPC ............ *G02B 6/3546* (2013.01); *G02B 6/3594* (2013.01); *G02F 1/3137* (2013.01);
(Continued)

(58) Field of Classification Search
CPC ......................... G02B 6/3546; G02B 6/3594
See application file for complete search history.

(56) References Cited

U.S. PATENT DOCUMENTS 5,010,542 A * 4/1991 Pfaff .................. H04Q 11/0005
385/17
6,430,329 B1 * 8/2002 Nir ..................... H04Q 11/0005
385/16
(Continued)

FOREIGN PATENT DOCUMENTS

CN    1348108    5/2002
CN    1942795    4/2007
(Continued)

OTHER PUBLICATIONS

International Preliminary Report on Patentability and Written Opinion dated Aug. 29, 2013 received in related PCT application No. PCT/JP2012/000970.
(Continued)

*Primary Examiner* — Daniel Petkovsek
(74) *Attorney, Agent, or Firm* — Workman Nydegger

(57) ABSTRACT

A waveguide type optical switch that can reduce the number of intersections in a matrix optical switch having the configuration of connecting unit optical switches and optical combining devices or optical branching devices to have a connecting function from "multiple inputs to one output" to "one input to multiple outputs". To reduce the number of intersections in an entire matrix optical switch, an optical combining device of M inputs and one output is divided into (M−1) pieces of unit optical combining elements each having two inputs and one output, which are arranged immediately after (N−1) pieces of respective output ports excluding one piece of the output port closer to the input in the matrix optical switch out of N pieces of the output ports in the optical switch of one input and N outputs.

4 Claims, 6 Drawing Sheets

(51) Int. Cl.
  *H04Q 11/00* (2006.01)
  *G02B 6/12* (2006.01)
  *G02F 1/01* (2006.01)
  *G02F 1/225* (2006.01)
  *G02F 1/21* (2006.01)

(52) U.S. Cl.
  CPC .. *H04Q11/0005* (2013.01); *G02B 2006/12145* (2013.01); *G02F 1/0147* (2013.01); *G02F 1/225* (2013.01); *G02F 2001/212* (2013.01); *H04Q 2011/0052* (2013.01)

(56) References Cited

U.S. PATENT DOCUMENTS

| | | | |
|---|---|---|---|
| 6,445,843 B1 * | 9/2002 | Duer | H04Q 11/0005 385/17 |
| 6,597,830 B1 * | 7/2003 | Nakabayashi | H04Q 11/0005 385/24 |
| 7,206,473 B2 * | 4/2007 | Mino | G02F 1/31 385/14 |
| 2007/0031087 A1 | 2/2007 | Miyadera et al. | |

FOREIGN PATENT DOCUMENTS

| | | |
|---|---|---|
| JP | 09-033740 | 2/1997 |
| JP | 2002-006347 | 1/2002 |
| JP | 2006-292872 | 10/2006 |
| JP | 2007-232991 | 9/2007 |
| JP | 2012-028929 | 2/2012 |
| WO | 2005/101075 A1 | 10/2005 |

OTHER PUBLICATIONS

M. Kobayashi et al., *Fibre Management Technique for Optical Device Integration on Circuit Board with Hundreds of Optical Connections,* Electronics Letters, vol. 36, No. 17, Aug. 17, 2000, pp. 1451-1452.

International Search Report dated Mar. 6, 2013, issued in PCT Application No. PCT/JP2012/000970.

Office Action in corresponding JP Application No. 2012-557830 dated Aug. 26, 2014.

* cited by examiner

WAVEGUIDE TYPE OPTICAL SWITCH

TECHNICAL FIELD

The present invention relates to a waveguide type optical switch used in optical communications or the like, and in particular, to a matrix optical switch that is configured to connect optical switches and optical combining devices or optical branching devices, and has a connecting function from "multiple inputs to one output" to "one input to multiple outputs". In addition, the present invention relates to a technique for realizing a circuit configuration in which the number of waveguide intersections is reduced.

BACKGROUND ART

An optical communication technique using an optical fiber as a transmission medium has brought in an increase on a transmission distance of a signal, thus building a large scale of an optical communication network. Recently along with wide spread of the Internet communications, communication traffic abruptly increases, thus increasing demands for large capacity, high bitrate and high functionality of the communication network. Until now, introduction of a multiple-wavelength communication technique for simultaneously transmitting a plurality of optical signals having different wavelengths by a single transmission route enables the transmission capacity between two points to be increased.

In the communication network, however, it is necessary to route or switch routes of signals in a node where a plurality of transmission paths combine, and along with an increase in transmission capacity, signal processing thereof has become a bottleneck. Until now, there is adopted a method in which the transmitted optical signal is once converted into an electrical signal, thereafter the route routing or route switching is performed, and the electrical signal is again converted into an optical signal, which is sent to a transmission path. From now on, it is expected that a method for executing the routing or switching processing of the signal route without converting the optical signal into the electrical signal can be adopted to significantly increase throughput of the node. An optical switch is a component absolutely necessary for introducing such a method to the optical communication network.

The optical switch is configured to connect a plurality of unit optical switch elements each having one input and two outputs or two inputs and one output, thereby making it possible to produce optical switches of various kinds of circuit configurations in regard to input/output port numbers or connecting patterns between ports, such as multiple connections of one input and multiple outputs (or multiple inputs and one output), multiple inputs and multiple outputs or two inputs and two output. Among them, a matrix optical switch of multiple inputs and multiple outputs is widely used as an optical switch for arbitrarily routing direction routes between a plurality of input and output ports.

Further, there is a demand for a matrix optical switch in which not only a regular connection of one input to one output but also a connection from "multiple inputs to one output" to "one input to multiple outputs" is made possible. That is, the matrix optical switch, which has a connecting function of multiple inputs to one output in which different optical signals that are input to a plurality of input ports combine, which is output to one output port among a plurality of output ports or a connecting function of one input to multiple outputs in which an optical signal that is input to one input port among a plurality of input ports is branched, which are output to a plurality of output ports, is required for building a flexible network.

There is known a configuration as shown in FIG. 1 as the configuration of a waveguide type optical switch in which the matrix optical switch having this connecting function from "multiple inputs to one output" to "one input to multiple outputs" is realized by a waveguide type device (refer to Non-Patent Literature 1).

The matrix optical switch shown in FIG. 1 comprises four optical switches 111 to 114 each having one input and four outputs (combination of four unit optical switch elements each having one input and two outputs), and four optical combining devices 131 to 134 each having four inputs and one output. The respective inputs in the optical switches 111 to 114 are connected to four external input ports 101 to 104. The respective outputs in the optical combining devices 131 to 134 are connected to external output ports 141 to 144.

The four output ports of the optical switch 111 are respectively connected to the input ports of the optical combining devices 131 to 134 via an intersection part 121. Similarly the four output ports of each of the optical switches 112 to 114 are respectively connected to the input ports of the optical combining devices 131 to 134 via the intersection part 121.

According to this configuration, the different optical signals that are input to the plurality of external input ports can combine to be output to one external output port.

In a case where the external input port and the external output port in the optical switch shown in FIG. 1 are reversed and the optical combining device is thus used as the optical branching device as it is, an optical signal that is input to one external input port can be branched to be output to a plurality of external output ports.

CITATION LIST

Non-Patent Literature

NPL 1: M. Kobayashi et al., Electronics Letters, vol. 36, no. 17, pp. 1451 to 1452, August 2000.

SUMMARY OF INVENTION

Technical Problem

The conventional matrix optical switch shown in FIG. 1 has a problem that many intersections are generated between the optical switch and the optical combining device. That is, in the intersection part 121 in FIG. 1, 14 waveguides by removing two waveguides out of 16 waveguides are intersected to connect the optical switches and the optical combining devices. The route formed of the maximum intersection number is a route from the external input port 101 to the external output port 144 (or a route from the external input port 104 to the external output port 141), and the intersections are generated at nine locations in this route. Further, the number of the intersections increases with an increase of the external input/output port number in the matrix optical switch. That is, in a case where the matrix optical switch is configured of N inputs and N outputs, $N^2$ waveguides are generated in that intersection part, and a waveguide having the maximum intersections among them has $(N-1)^2$ intersections.

Generally in the waveguide type optical device, insertion losses and cross talk are generated in the intersection of the waveguide to degrade optical characteristics thereof. The insertion loss and the cross talk can be reduced to some degree by increasing the intersection angle, but the waveguide is required to be developed on a substrate for increasing the intersection angle, therefore requiring a large space.

Therefore, it is difficult to produce the matrix optical switch having the connecting function from "multiple inputs to one output" to "one input and multiple outputs" as the waveguide type optical switch on a single substrate, and the configuration, in which the optical switch and the optical combining device are respectively produced on different substrates and the intersection part therebetween is formed by using optical fiber wiring, is required.

The present invention is made in view of solving this problem, and an object of the present invention is to provide a waveguide type optical switch that can reduce the number of intersections and can be produced on a single substrate in a matrix optical switch having the configuration of connecting unit optical switch elements and optical combining devices or optical branching devices to have a connecting function from "multiple inputs to one output" to "one input to multiple outputs".

Solution to Problem

The present invention provides a waveguide type optical switch having a form of a matrix optical switch of M inputs and N outputs formed on a single substrate, where M and N are integers different from each other, M and N each having a value greater than or equal to three, the matrix optical switch comprising M optical switches each having one input and N outputs, and N optical combining devices each having M inputs and one output, wherein the a-th input of the matrix optical switch is the input of the a-th optical switch, where a is an integer from 1 to M, the b-th output of the matrix optical switch is the output of the b-th optical combining device, where b is an integer from 1 to N, each of the optical switches consists of N−1 unit optical switch elements each having one input and two outputs, and each of the optical combining devices consists of M−1 unit optical combining elements each having two inputs and one output, wherein for each optical switch, the input of the first unit optical switch element forms the input of the optical switch, one of the outputs of the i-th unit optical switch element is connected to the input of the (i+1)-th unit optical switch element, where i is an integer from 1 to N−2, the other of the outputs of the i-th unit optical switch element forms the i-th output of the optical switch, and the two outputs of the (N−1)-th unit optical switch element form the (N−1)-th output and the N-th output of the optical switch, wherein for each optical combining device, two inputs of the first unit optical combining element form the first and second inputs of the optical combining device, one of the inputs of the j-th unit optical combining element is connected to the output of the (j−1)-th unit optical combining element, where j is an integer from 2 to M−1, the other of the inputs of the j-th unit optical combining element forms the (j+1)-th input of the optical combining device, and the output of the (M−1)-th unit optical combining element forms the output of the optical combining device, wherein in the matrix optical switch, the p-th optical switch and the q-th optical combining device are connected between any output in the p-th optical switch and any input in the q-th optical combining device, where p is an integer from 1 to M and q is an integer from 1 to N, wherein in a case where any output in the p-th optical switch is the k-th output in the connection, any input in the q-th optical combining device is the k'-th input, k being an integer from 1 to N and k' being an integer from 1 to M, in a case where k is from two to N−1 in the connection, a waveguide intersection is not included in the connection between the output of the unit optical switch element forming the k-th output in the p-th optical switch and the input of the unit optical combining element forming the k'-th input in the q-th optical combining device.

According to an embodiment of the present invention, for each optical combining device, each unit optical combining element includes two input terminals, and a combining optical power ratio between the two input terminals of the first unit optical combining element is 1:1, and a combining optical power ratio between an input terminal connected to the output of the optical switch of the j-th unit optical combining element and an input terminal connected to the other unit optical combining element is 1:j, where j is an integer from 2 to M−1.

The present invention provides a waveguide type optical switch having a form of a matrix optical switch of N inputs and M outputs formed on a single substrate, where M and N are integers different from each other, M and N each having a value greater than or equal to three, the matrix optical switch comprising N optical branching devices each having one input and M outputs, and M optical switches each having N inputs and one output, wherein the a-th input in the matrix optical switch consists of the input of the a-th optical branching device, where a is an integer from 1 to N, the b-th output of the matrix optical switch consists of the output of the b-th the optical switch, where b is an integer from 1 to M each of the branching devices consists of M-1 unit optical branching elements each having one input and two outputs, and each of the optical switches consists of N-1 unit optical switch elements each having two inputs and one output, wherein for each optical branching device, the input of the first unit optical branching element forms the input of the optical branching device, one of the outputs of the i-th unit optical branching element is connected to the input of the (i+1)-th unit optical branching element, where i is an integer from 1 to M-2, the other of the outputs of the i-th unit optical branching element forms the i-th output of the optical branching device, and two outputs of the (M−1)-th unit optical branching element form the (M−1)-th output and the M-th output of the optical branching device, wherein for each optical switch, two inputs of the first unit optical switch element form the first and second inputs for each optical switch, one of the inputs of the j-th unit optical switch element is connected to the output of the (j−1)-th unit optical switch element, where j is an integer from 2 to N-1, the other of the inputs of the j-th unit optical switch element forms the (j+1)-th input of the optical switch, and the output of the (N−1)-th unit optical switch element forms the output of the optical switch, wherein in the matrix optical switch, the p-th optical branching device and the q-th optical switch are connected between any output in the p-th optical branching device and any input in the q-th optical switch, where p is an integer from 1 to N and q is an integer from 1 to M, wherein in a case where any output in the p-th optical branching device is the k-th output in the connection, where k is an integer from 1 to M, any input in the q-th optical switch is the k'-th input, where k' is an integer from 1 to M, and in a case where k is from 2 to M−1 in the connection, a waveguide intersection is not included in the connection between the output of the unit optical branching element forming the k-th output in the p-th optical branching device and the input of the unit optical switch element forming the k'-th input in the q-th optical switch.

According to an embodiment of the present invention, for each optical branching device, each unit optical combining element includes two input terminals, and a branching optical power ratio between the two output terminals of the (M−1)-th unit optical branching element is 1:1, and a branching optical power ratio between an output terminal connected to the input of the optical switch in the i-th unit optical branching element and an output terminal connected to the other unit optical branching element is 1:(M−i), where i is an integer from 1 to M=2.

Advantageous Effects of the Invention

According to the embodiment in the present invention, the optical combining device of M inputs and one output is divided into (M−1) pieces of the unit optical combining elements each having two inputs and one output, which are arranged immediately after (N−1) pieces of the respective output ports excluding one piece of the output port near the input in the matrix optical switch from N pieces of the output ports in the optical switch of one input and N outputs. Therefore the output port of each optical switch does not combine in the optical combining device after the intersection, but intersects after combining in the unit optical combining element. Therefore the number of the intersections in an entire matrix optical switch can be reduced.

According to the different embodiment in the present invention, the optical branching device of one input and M outputs is divided into (M−1) pieces of the unit optical branching elements each having one input and two outputs, which are arranged immediately before (N−1) pieces of the respective input ports excluding one piece of the input port near the output of the matrix optical switch from N pieces of the input ports in the optical switch of N inputs and one output. Therefore the output is not configured to be branched in the optical branching device, and thereafter intersect to be input to the optical switch, but intersects, which is thereafter branched in the unit optical branching element to be input to the optical switch. Therefore the number of the intersections in an entire matrix optical switch can be reduced.

Therefore it is possible to form the matrix optical switch having the connecting function from "multiple inputs to one output" to "one input to multiple outputs" on a single substrate. As a result, it is possible to miniaturize the optical switch, and the component number can be reduced since a component such as an optical fiber wiring plate is not necessary.

DESCRIPTION OF EMBODIMENTS

Examples of a method of a waveguide type optical switch for carrying out the present invention include a method using a thermo-optic effect, a method using an electro-optical effect, a method using a refractive index change by current injection, and the like.

In addition, examples of a material that is used in the method using the thermo-optic effect include silica-based glass, organic polymer, silicon, and the like. Among them, a unit optical switch element using the thermo-optic effect of a silica-based optical waveguide has excellent consistency with an optical fiber, a low insertion loss, and in addition thereto, small principled polarization dependence, and the configuration material is physically and chemically stable and is excellent in reliability. Therefore it has the maximum practicability. However, for carrying out the present invention, a unit optical switch element other than the unit optical switch element using the thermo-optic effect of the silica-based optical waveguide may be used.

Hereinafter, embodiments in the present invention will be explained by specific examples with reference to the drawings.

First Embodiment

Figure 1:
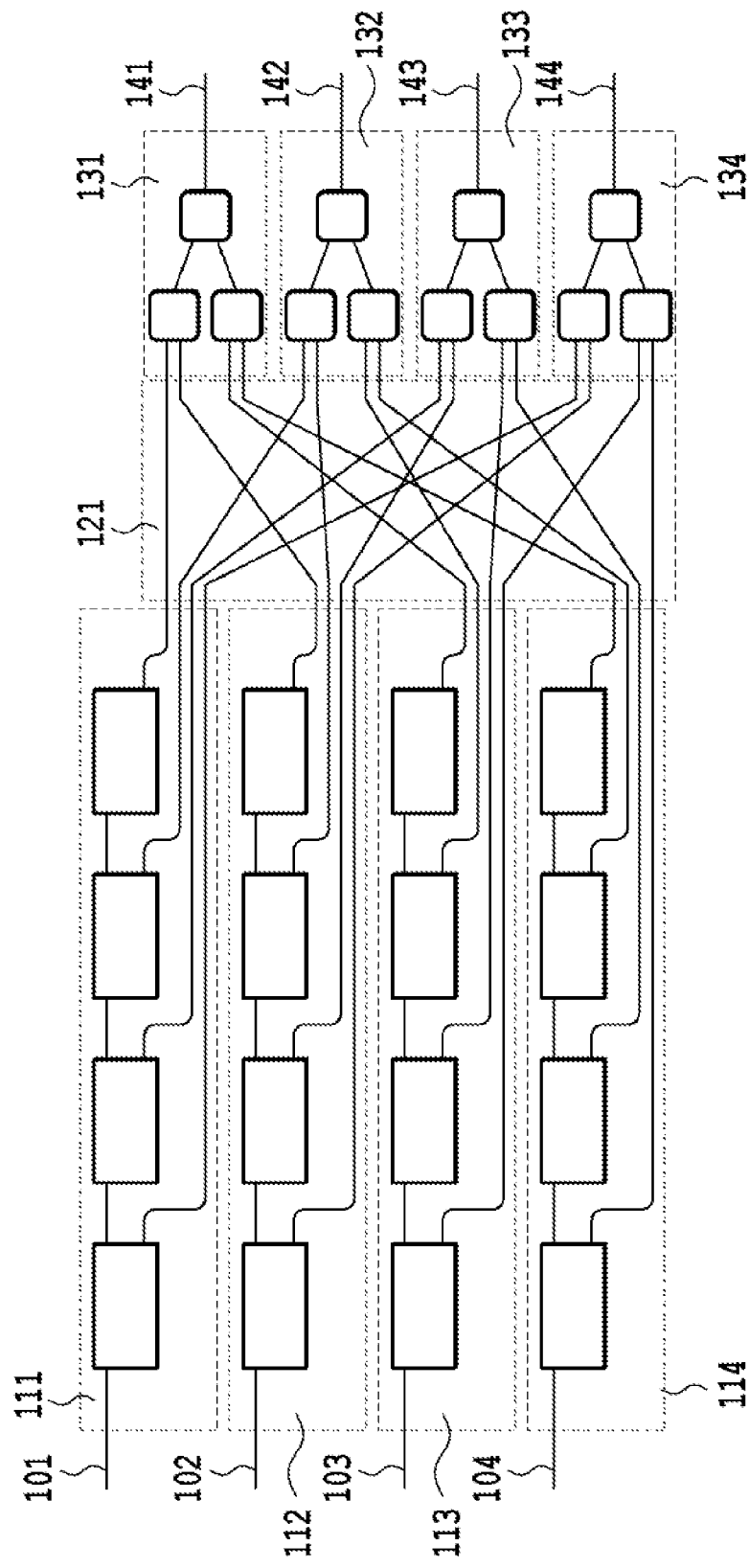
FIG. 1 is an explanatory diagram showing a circuit configuration of a conventional matrix optical switch of four inputs and four outputs.
Figure 2:
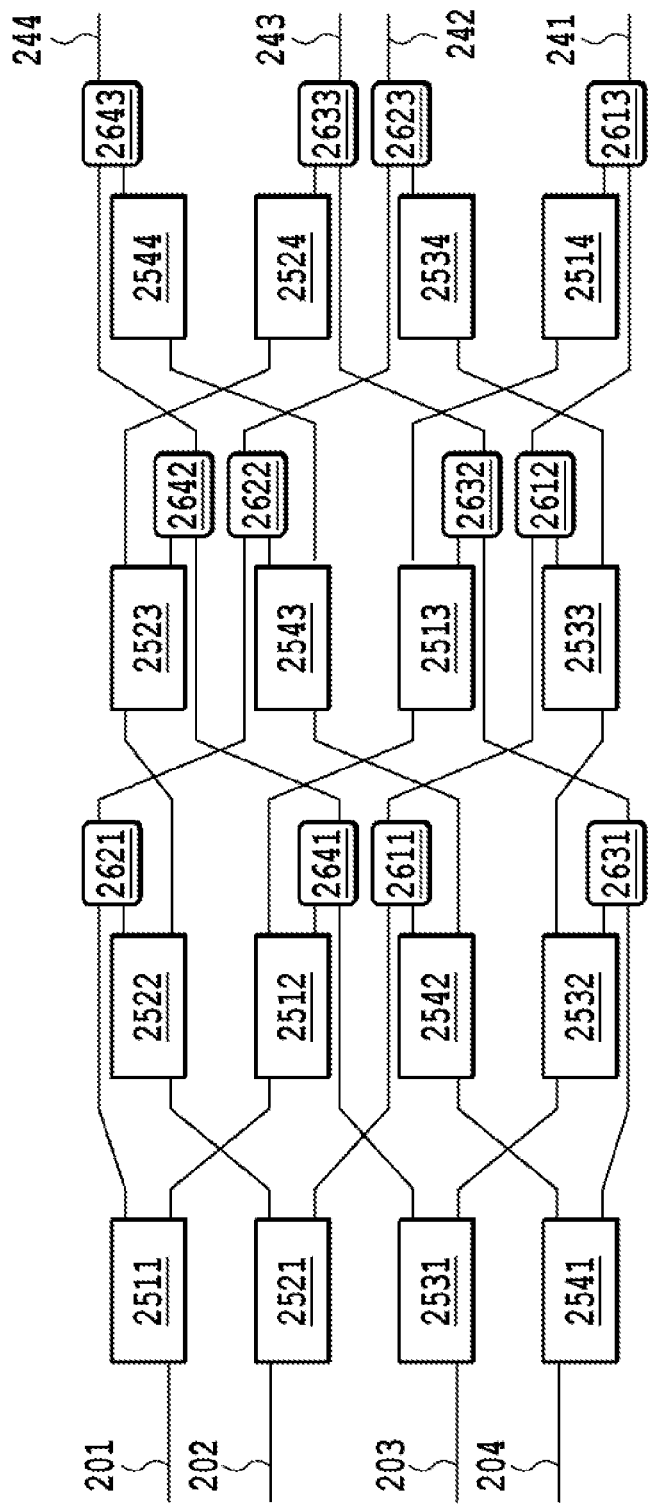
FIG. 2 is an explanatory diagram showing a circuit configuration of a matrix optical switch of four inputs and four outputs according to a first embodiment in the present invention.

FIG. 2 is an explanatory diagram showing a first embodiment in the present invention, and shows an example configured of a matrix optical switch of four inputs and four outputs.

The matrix optical switch shown in FIG. 2 comprises 16 pieces of unit optical switch elements (2511 to 2514, 2521 to 2524, 2531 to 2534, and 2541 to 2544) each having one input and two outputs, and 12 pieces of unit optical combining elements (2611 to 2613, 2621 to 2623, 2631 to 2633, and 2641 to 2643) each having two inputs and one output. The four unit optical switch elements 2511, 2512, 2513 and 2514 are connected in a vertical line, which forms an optical switch 211 of one input and four outputs (the code is not illustrated in the figure). Similarly the unit optical switch elements 2521 to 2524, the unit optical switch elements 2531 to 2534, and the unit optical switch elements 2541 to 2544 are respectively connected in a vertical line, and respectively form an optical switch 212, an optical switch 213, and an optical switch 214 (the code is not illustrated in the figure) each having one input and four outputs.

The three unit optical combining elements 2611, 2612, and 2613 are connected in a vertical line, which form an optical combining device 231 of four inputs and one output (the code is not illustrated in the figure). Similarly the unit optical combining elements 2621 to 2623, the unit optical combining elements 2631 to 2633, and the unit optical combining elements 2641 to 2643 are respectively connected in a vertical line, and respectively form an optical combining device 232, an optical combining device 233, and an optical combining device 234 (the code is not illustrated in the figure) each having four inputs and one output.

Herein for making each ratio of optical powers combining from four respective input ports to one output port in the optical combining device 231 equal, each combining optical power ratio of the unit optical combining elements 2611, 2612 and 2613 is set as 1:1, 2:1, and 3:1. It is apparent that the combining optical power ratio is set in the order of 1:1, 2:1, .

. . . , and (N−1):1 from the unit optical combining element closer to the input of the matrix optical switch. For obtaining this combining optical power ratio, a directional coupler or an asymmetrical Y branch can be used as the unit optical combining element. One of the two input ports in the unit optical combining element 2612, which has a larger combining optical power ratio, is connected to the output port in the unit optical combining element 2611. One of the two input ports in the unit optical combining element 2613, which has a larger combining optical power ratio, is connected to the output port in the unit optical combining element 2612. The same configuration is applied to the unit optical combining elements 2621 to 2623, 2631 to 2633, and 2641 to 2643 forming the optical combining devices 232 to 234.

The respective inputs of the optical switches 211 to 214 are connected to the four external input ports 201 to 204, and the respective outputs of the optical combining devices 231 to 234 are connected to the four external output ports 241 to 244.

In the matrix optical switch shown in FIG. 2, the output port in the unit optical switch element 2511 included in the optical switch 211 is connected to the input port in the unit optical combining element 2612. In addition, the unit optical combining element 2641 is arranged immediately after the unit optical switch element 2512, and the output port in the unit optical switch element 2512 and the input port in the unit optical combining element 2641 are connected without the intersection with the other route. Similarly the output port in the unit optical switch element 2513 and the input port in the unit optical combining element 2632, and the output port in the unit optical switch element 2514 and the input port in the unit optical combining element 2613 are respectively connected without the intersection with the other route.

The output port in the unit optical switch element 2521 included in the optical switch 212 is connected to the input port in the unit optical combining element 2611. In addition, the unit optical combining element 2621 is arranged immediately after the unit optical switch element 2522, and the output port in the unit optical switch element 2522 and the input port in the unit optical combining element 2621 are connected without the intersection with the other route. Similarly the output port in the unit optical switch element 2523 and the input port in the unit optical combining element 2642, and the output port in the unit optical switch element 2524 and the input port in the unit optical combining element 2633 are respectively connected without the intersection with the other route.

The output port in the unit optical switch element 2531 included in the optical switch 213 is connected to the input port in the unit optical combining element 2641. In addition, the unit optical combining element 2631 is arranged immediately after the unit optical switch element 2532, and the output port in the unit optical switch element 2532 and the input port in the unit optical combining element 2631 are connected without the intersection with the other route. Similarly the output port in the unit optical switch element 2533 and the input port in the unit optical combining element 2612, and the output port in the unit optical switch element 2534 and the input port in the unit optical combining element 2623 are respectively connected without the intersection with the other route.

The output port in the unit optical switch element 2541 included in the optical switch 214 is connected to the input port in the unit optical combining element 2631. In addition, the unit optical combining element 2611 is arranged immediately after the unit optical switch element 2542, and the output port in the unit optical switch element 2542 and the input port in the unit optical combining element 2611 are connected without the intersection with the other route. Similarly the output port in the unit optical switch element 2543 and the input port in the unit optical combining element 2622, and the output port in the unit optical switch element 2544 and the input port in the unit optical combining element 2643 are respectively connected without the intersection with the other route.

According to this configuration, the output port of each optical switch does not combine in the optical combining device after the intersection, but intersects after combining in the unit optical combining element. Therefore the number of the intersections in an entire matrix optical switch can be reduced. Actually in the optical switch in FIG. 2, even in a case where the number of the intersections in one route (the route from the external input port 201 to the external output port 241 or the route from the external input port 204 to the external output port 244) is maximized, it is five locations at most.

It should be noted that in FIG. 2, the unit optical switch elements 2514, 2524, 2534 and 2544 each having one input and two outputs, each of which is illustrated as one input and one output by omitting one output, are arranged for enhancing an extinction ratio, and the present invention can perform a basic operation without them. This unit optical switch element has the effect for enhancing the extinction ratio of the matrix optical switch even if the extinction ratio of the unit optical switch element of one input and two outputs is insufficient.

In addition, in the first embodiment, even if the external input port is reversed to the external output port, the external output port is reversed to the external input port in the matrix optical switch, the optical combining device is reversed to the optical branching device, and the unit optical combining element is reversed to the unit optical branching element, it is apparent that the number of the intersections in the entire matrix optical switch can similarly be reduced.

In the above-mentioned example, for simplification, the matrix optical switch of four inputs and four outputs is explained, but it is obvious for those skilled in the art that the technical characteristics in the present embodiment can be applied also to a matrix optical switch of N inputs and N outputs.

Second Embodiment

Figure 3:
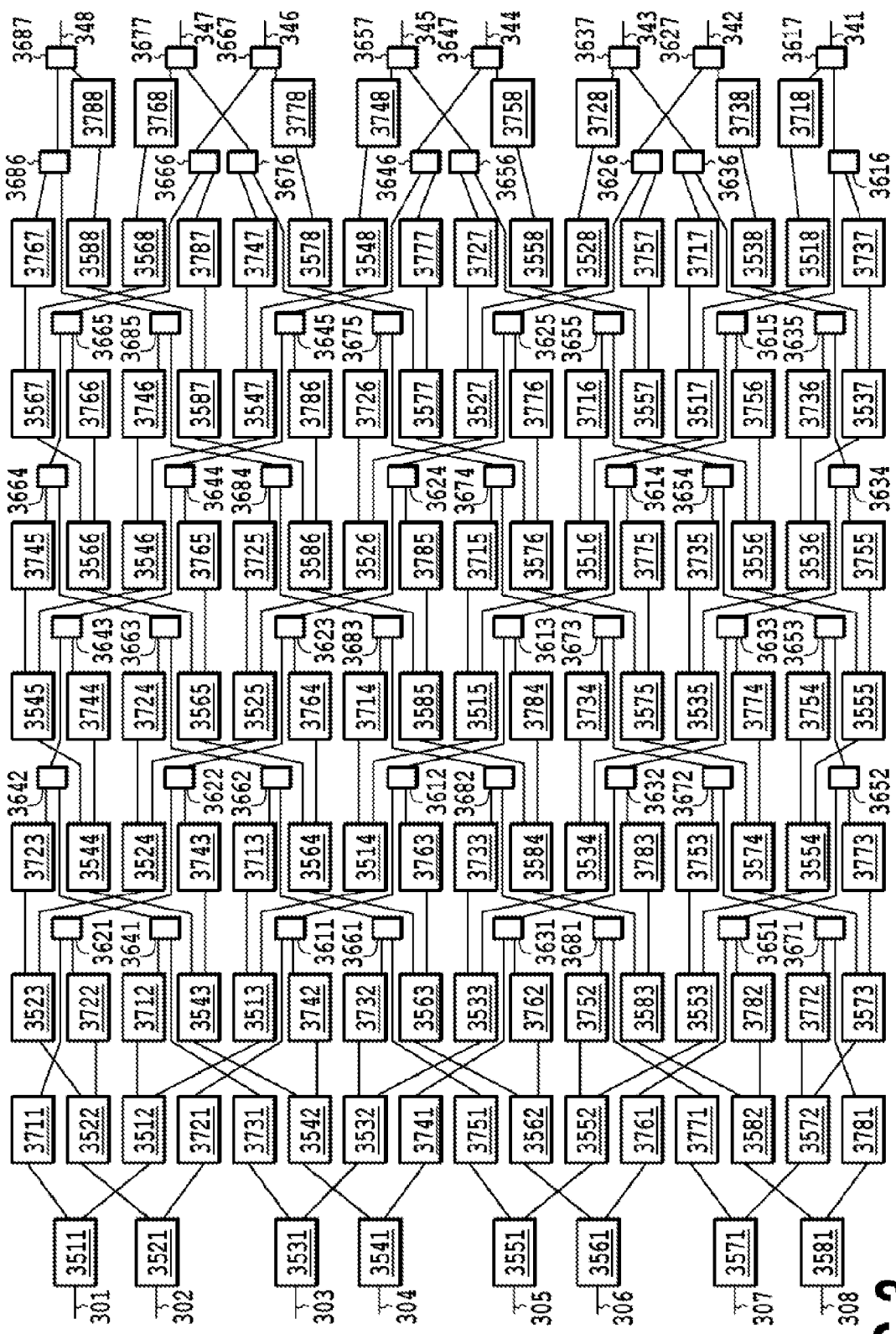
FIG. 3 is an explanatory diagram showing a circuit configuration of a matrix optical switch of eight inputs and eight outputs according to a second embodiment in the present invention.

FIG. 3 is an explanatory diagram showing a second embodiment in the present invention, and shows an example configured of a matrix optical switch of eight inputs and eight outputs.

The matrix optical switch shown in FIG. 3 comprises 64 pieces of unit optical switch elements (3511 to 3518, 3521 to 3528, 3531 to 3538, 3541 to 3548, 3551 to 3558, 3561 to 3568, 3571 to 3578, and 3581 to 3588) each having one input and two outputs, 64 pieces of gate optical switch elements (3711 to 3718, 3721 to 3728, 3731 to 3738, 3741 to 3748, 3751 to 3758, 3761 to 3768, 3771 to 3778, and 3781 to 3788) each having one input and one output, and 56 pieces of unit optical combining elements (3611 to 3617, 3621 to 3627, 3631 to 3637, 3641 to 3647, 3651 to 3657, 3661 to 3667, 3671 to 3677, and 3681 to 3687) each having two inputs and one output. The eight unit optical switch elements 3511, 3512, 3513, 3514, 3515, 3516, 3517, and 3518 are connected in a vertical line, and further, the gate optical switch elements 3711 to 3718 for improving an extinction ratio are connected to the output ports of the respective unit optical switch elements, which forms an optical switch 311 of one input and eight outputs (the code is not illustrated in the figure). Similarly the unit optical switch elements 3521 to 3528, 3531 to 3538, 3541 to 3548, 3551 to 3558, 3561 to 3568, 3571 to 3578, and 3581 to 3588 are respectively connected in a vertical line, and the gate optical switch elements 3721 to 3728, 3731 to 3738, 3741 to 3748, 3751 to 3758, 3761 to 3768, 3771 to 3778, and 3781 to 3788 are connected to the output ports of the respective unit optical switch elements, which form optical switches 312, 313, 314, 315, 316, 317, and 318 (the code is not illustrated in the figure) each having one input and eight outputs.

The seven unit optical combining elements 3611, 3612, 3613, 3614, 3615, 3616, and 3617 are connected in a vertical line, which forms an optical combining device 331 of eight inputs and one output (the code is not illustrated in the figure). Similarly the unit optical combining elements 3621 to 3627, 3631 to 2637, 3641 to 3647, 3651 to 3657, 3661 to 2667, 3671 to 3677, and 3681 to 3687 are respectively connected in a vertical line, which form optical combining devices 332, 333, 334, 335, 336, 337, and 338 each having eight inputs and one output.

Herein for making each ratio of optical powers combining from eight respective input ports to one output port in the optical combining device 331 equal, each combining optical power ratio of the unit optical combining elements 3611, 3612, 3613, 3614, 3615, 3616, and 3617 is set as 1:1, 2:1, 3:1, 4:1, 5:1, 6:1 and 7:1. It is apparent that the combining optical power ratio is set in the order of 1:1, 2:1, . . . , and (N−1):1 from the unit optical combining element closer to the input of the matrix optical switch. For obtaining this combining optical power ratio, a directional coupler or an asymmetrical Y branch can be used as the unit optical combining element. One of the two input ports in the unit optical combining element 3612, which has a larger combining optical power ratio, is connected to the output port in the unit optical combining element 3611. One of the two input ports in the unit optical combining element 3613, which has a larger combining optical power ratio, is connected to the output port in the unit optical combining element 3612. Hereinafter, similarly one of the two input ports in each of the unit optical combining elements 3614, 3615, 3616, and 3617, which has a larger combining optical power ratio, is connected to the output port in each of the unit optical combining elements 3613, 3614, 3615, and 3616.

The same configuration is applied to the unit optical combining elements 3621 to 3627, 3631 to 3637, 3641 to 3647, 3651 to 3657, 3661 to 3667, 3671 to 3677, and 3681 to 3687 forming the optical combining devices 332 to 338.

The respective inputs in the optical switches 311 to 318 are connected to eight external input ports 301 to 308, and the respective outputs of the optical combining devices 331 to 338 are connected to external output ports 341 to 348.

In the matrix optical switch shown in FIG. 3, the output port in the gate optical switch element 3711 included in the optical switch 311 is connected to the input port in the unit optical combining element 3621. In addition, the unit optical combining element 3641 is arranged immediately after the gate optical switch element 3712, and the output port in the gate optical switch element 3712 and the input port in the unit optical combining element 3641 are connected without the intersection with the other route. Similarly the output port in the gate optical switch element 3713 and the input port in the unit optical combining element 3662, the output port in the gate optical switch element 3714 and the input port in the unit optical combining element 3683, the output port in the gate optical switch element 3715 and the input port in the unit optical combining element 3674, the output port in the gate optical switch element 3716 and the input port in the unit optical combining element 3655, the output port in the gate optical switch element 3717 and the input port in the unit optical combining element 3636, the output port in the gate optical switch element 3718 and the input port in the unit optical combining element 3617 are respectively connected without the intersection with the other route.

The output port in the gate optical switch element 3721 included in the optical switch 312 is connected to the input port in the unit optical combining element 3611. In addition, the unit optical combining element 3621 is arranged immediately after the gate optical switch element 3722, and the output port in the gate optical switch element 3722 and the input port in the unit optical combining element 3621 are connected without the intersection with the other route. Similarly the output port in the gate optical switch element 3723 and the input port in the unit optical combining element 3642, the output port in the gate optical switch element 3724 and the input port in the unit optical combining element 3663, the output port in the gate optical switch element 3725 and the input port in the unit optical combining element 3684, the output port in the gate optical switch element 3726 and the input port in the unit optical combining element 3675, the output port in the gate optical switch element 3727 and the input port in the unit optical combining element 3656, the output port in the gate optical switch element 3728 and the input port in the unit optical combining element 3637 are respectively connected without the intersection with the other route.

Hereinafter, similarly eight output ports in each of the optical switches 313 to 318 are respectively connected to the unit optical combining elements.

According to this configuration, the output port of each optical switch does not combine in the optical combining device after the intersection, but intersects after combining in the unit optical combining element. Therefore the number of the intersections in an entire matrix optical switch can be reduced. Actually in the optical switch in FIG. 3, the intersections in one route are 13 locations at most.

It should be noted that in FIG. 3, the unit optical switch elements 3518, 3528, 3538, 3548, 3558, 3568, 3578, and 3588 each having one input and two outputs, each of which is illustrated as one input and one output by omitting one output, and the gate optical switch elements are arranged for enhancing an extinction ratio, and the present invention can perform a basic operation without them. The unit optical switch element and the gate optical switch element have the effect for enhancing the extinction ratio of the matrix optical switch even if the extinction ratio of the unit optical switch element of one input and two outputs is insufficient.

In addition, in the second embodiment, even if the external input port is reversed to the external output port and the external output port is reversed to the external input port in the matrix optical switch, the optical combining device is reversed to the optical branching device, and the unit optical combining element is reversed to the unit optical branching element, it is apparent that the number of the intersections in the entire matrix optical switch can similarly be reduced.

The matrix optical switch of eight inputs and eight outputs based upon the circuit configuration shown in FIG. 3 was produced by the optical circuit as follows.

Figure 4A:
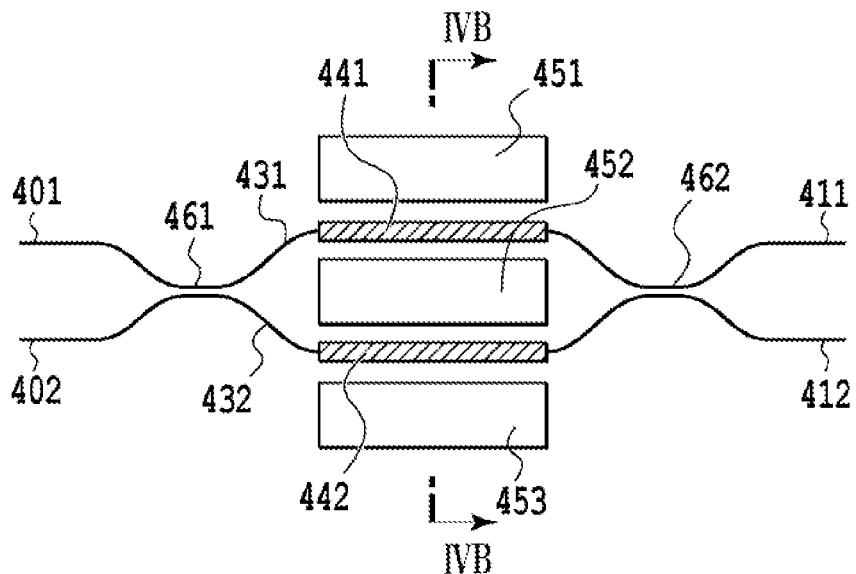
FIG. 4A is an explanatory diagram and a top view of a configuration example of an optical switch element used in the present invention.
Figure 4B:
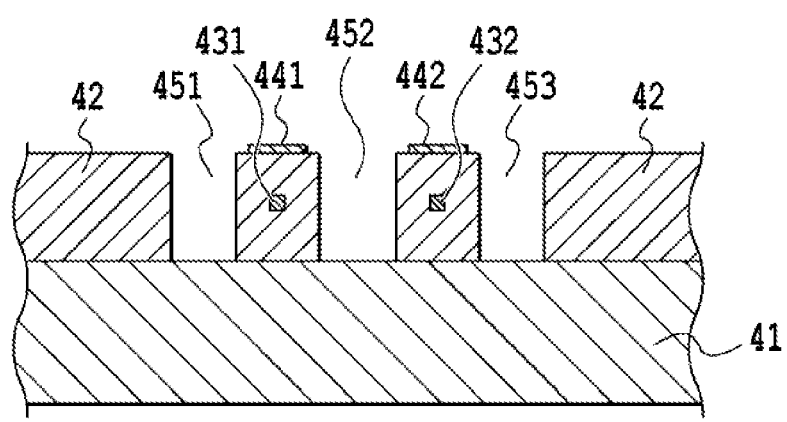
FIG. 4B is an explanatory diagram of the configuration example of the optical switch element used in the present invention, and a cross section taken along a cross section line IVB-IVB in FIG. 4A.

A single mode optical waveguide having a clad layer formed by silica-based glass and an embedded type core portion on a silicon substrate having a thickness of 1 mm and a diameter of 6 inches was produced by a combination of a deposit technology of silica-based glass films using a flame hydrolysis reaction of raw material gas of $SiCl_4$ or $GeCl_4$, and a reactive ion etching technology, and a thin-film heater and electrodes for power supply were produced on a surface of the clad layer by vacuum vaporization and patterning. The produced optical waveguide has a core dimension of 6 μm×6 μm, and a relative refractive index difference thereof from the clad layer was set as 1.5%. The waveguide type optical switch in the present embodiment was formed by using this optical waveguide and combining a straight waveguide and a curved waveguide. The optical switch element is a Mach-Zehnder interferometer circuit in which an effective optical path length of an arm waveguide is one-half of a signal optical wavelength as shown in FIG. 4A and FIG. 4B. In the present embodiment, since the signal optical wavelength is 1.55 μm and a refractive index of the silica-based glass is 1.45, a difference in an actual arm optical waveguide length was set as 0.534 μm. Thin-film heaters (441 and 442) each having a thickness of 0.3 μm, a width of 20 μm and a length of 2 mm were formed on a surface of a clad layer (42) as a phase shifter by a thermo-optic effect. Further, heat-insulating grooves (451, 452 and 453) were formed along the thin-film heaters (441 and 442), each having a depth to the extent that the silicon substrate (41) is exposed. A length of the optical switch element configured by the Mach-Zehnder interferometer circuit as shown in FIG. 4A and FIG. 4B was 5.5 mm. The optical switch element and the Y branch type optical combining circuit were connected by a curved waveguide having the minimum bending radius R=2 mm, and the matrix optical switch of eight inputs and eight outputs based upon the circuit configuration shown in FIG. 3 was arranged on one chip. The chip size was 110 mm×15 mm.

An optical fiber was connected to the external input port and the external output port in the matrix optical switch chip of eight inputs and eight outputs produced by the above-mentioned method to measure optical characteristics. As a result, the insertion loss was 12 dB or less including a principle loss 9 dB by the combining, and the extinction ratio was 45 dB or more. The input and output ports were reversed, wherein light was input from a side of the external output port and optical characteristics of the light that was output to the external input port were measured. As a result, the insertion loss and the extinction ratio had the same characteristics.

Third Embodiment

In the above-mentioned first and second embodiments, in a case where M=N=4, and M=N=8 (that is, in a case of M=N), the waveguide type optical switch in the form of the matrix optical switch of M inputs and N outputs is explained. However, if M and N differ with each other and are an integral number of three or more, the configuration of the present invention can be carried out. That is, if it has at least the following characteristics, the waveguide type optical switch in the present invention can be carried out.

[1] The waveguide type optical switch is a matrix optical switch comprising M pieces of optical switches each having one input and N outputs, and N pieces of optical combining devices each having M inputs and one output. The a-th input (a is an integral number of 1 to M) in the matrix optical switch comprises the input in the a-th optical switch of one input and N outputs. The b-th output (b is an integral number of 1 to N) in the matrix optical switch comprises the output in the b-th optical combining device of M inputs and one output.

[2] Each of the optical switches comprises (N−1) pieces of unit optical switch elements each having one input and two outputs, and each of the optical combining devices comprises (M−1) pieces of unit optical combining elements each having two inputs and one output.

[3] In the optical switch, the input of the first unit optical switch element forms the input of the optical switch. In addition, one of the outputs in the i-th (i is an integral number of 1 to (N−2)) unit optical switch element is connected to the input of the (i+1)-th unit optical switch element, and the other of the outputs in the i-th unit optical switch element forms the i-th output in the optical switch. Two outputs in the (N−1)-th unit optical switch element form the (N−1)-th output and the N-th output in the optical switch.

[4] In the optical combining device, two inputs of the first unit optical combining element forms the first and second inputs in the optical combining device, one of the inputs in the j-th (j is an integral number of 2 to (M−1)) unit optical combining element is connected to the output of the (j−1)-th optical combining element, and the other of the inputs in the j-th unit optical combining element forms the (j+1)-th input in the optical combining device. The output in the (M−1)-th unit optical combining element forms the output in the optical combining device.

[5] In the matrix optical switch, the p-th optical switch (p is an integral number of 1 to M) in the optical switches and the q-th optical combining device (q is an integral number of 1 to N) in the optical combining devices are configured to be connected between any output in the p-th optical switch and any input in the q-th optical combining device. In a case where any output in the p-th optical switch is the k-th (k is an integral number of 1 to N) output in the above-mentioned connection, any input in the q-th optical combining device is the k-th input. In a case where k is from 2 to (N−1) in the above-mentioned connection, the waveguide intersection is not included in the connection between the output of the unit optical switch element forming the k-th output in the p-th optical switch, and the input of the unit optical combining element forming the k-th input in the q-th optical combining device.

With the above-mentioned characteristics, the matrix optical switch in which the loss is reduced by reducing the number of the intersections can be realized by the waveguide type optical switch that is inexpensive in the producing process and is suitable for mass production.

The further characteristic of the present invention is that a combining optical power ratio between two input terminals of the first unit optical combining element in the above-mentioned optical combining device is 1:1, and a combining optical power ratio between an input terminal connected to the input of the optical switch in the j-th unit optical combining element (j is an integral number of 2 to (M−1)) and an input terminal connected to the other unit optical combining element is 1:j. Therefore even if the optical signal transmits through any number of the unit optical combining elements (any number of 1 to (M−1) pieces), variations in optical intensity by the number of the combining times can be suppressed in the output in the waveguide type optical switch.

It should be noted that also in the third embodiment, as similar to the first and second embodiments, the unit optical switch element of one input and one output and the gate optical switch element may be arranged for enhancing an extinction ratio. However, the present invention can perform a basic operation without them. The unit optical switch element of one input and one output and the gate optical switch element have the effect for enhancing the extinction ratio of the matrix optical switch even if the extinction ratio of the unit optical switch element of one input and two outputs is insufficient.

Fourth Embodiment

In the third embodiment, even if the external input port is reversed to the external output port and the external output port is reversed to the external input port in the matrix optical switch, the optical combining device is reversed to the optical branching device, and the unit optical combining element is reversed to the unit optical branching element, it is apparent that the number of the intersections in the entire matrix optical switch can similarly be reduced.

In a case where the input and the output are reversed, attention should be paid to that the closer to the output, the combining optical power ratio in the unit optical combining element is the larger, and similarly the closer to the input, the branching optical power ratio in the unit optical branching element is the larger. That is, a branching optical power ratio between two output terminals of the (M−1)-th unit optical branching element in the optical branching device is 1:1, and a branching optical power ratio between an output terminal connected to the output of the optical switch in the i-th unit optical branching element (i is an integral number of 1 to (M−2)) and an output terminal connected to the other unit optical branching element is 1:(M−i). Therefore even if the optical signal transmits through any number of the unit optical branching elements (any number of 1 to (M−1) pieces), variations in optical intensity by the number of the branching times can be suppressed in the output in the waveguide type optical switch.

Fifth Embodiment

Figure 5:
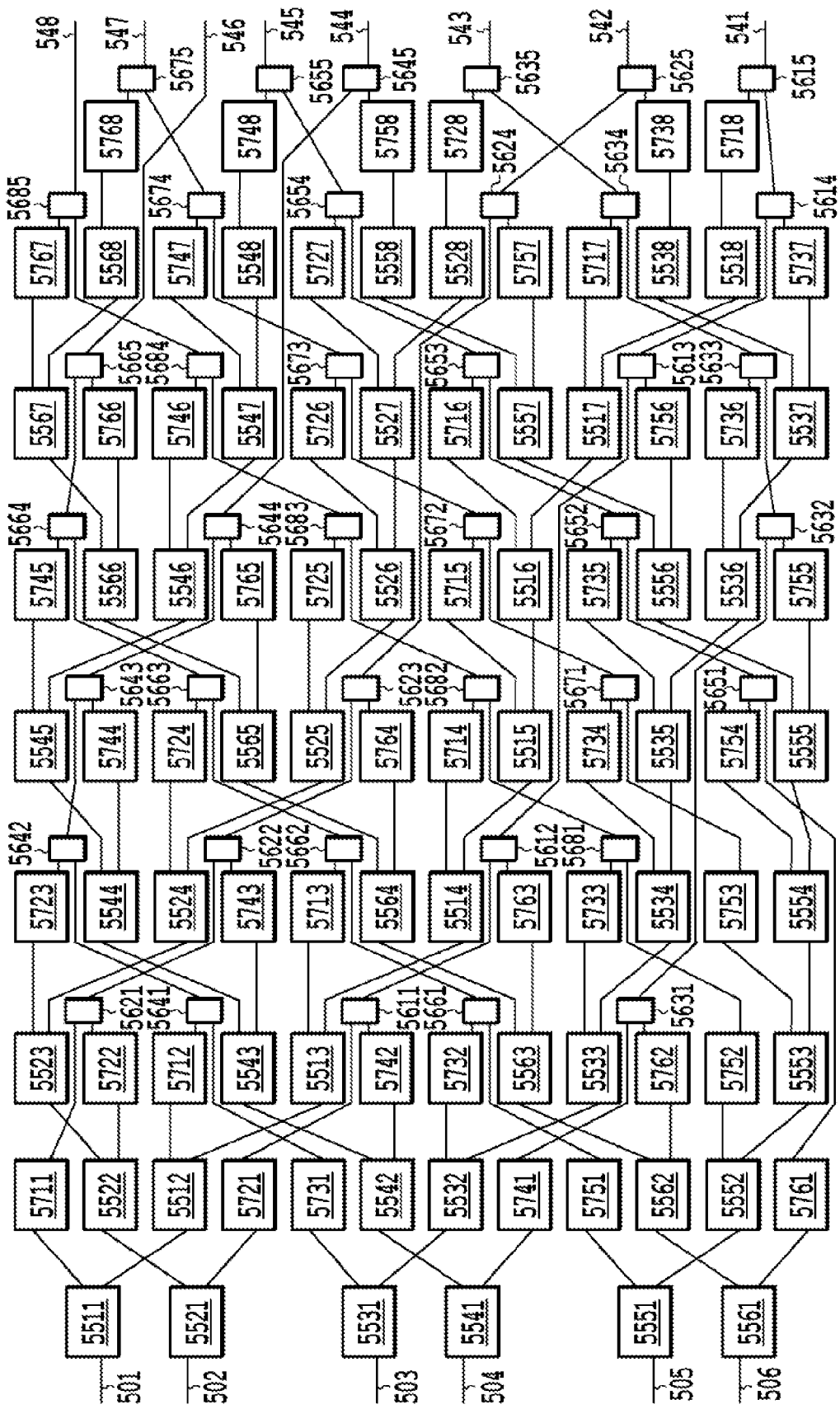
FIG. 5 is an explanatory diagram showing a circuit configuration of a matrix optical switch of six inputs and eight outputs according to a fifth embodiment in the present invention.

FIG. 5 is an explanatory diagram showing a fifth embodiment in the present invention, and shows an example configured of a matrix optical switch of six inputs and eight outputs.

The matrix optical switch shown in FIG. 5 comprises 48 pieces of unit optical switch elements (5511 to 5518, 5521 to 5528, 5531 to 5538, 5541 to 5548, 5551 to 5558, and 5561 to 5568) each having one input and two outputs, 48 pieces of gate optical switch elements (5711 to 5718, 5721 to 5728, 5731 to 5738, 5741 to 5748, 5751 to 5758, and 5761 to 5768) each having one input and one output, and 40 pieces of unit optical combining elements (5611 to 5615, 5621 to 5625, 5631 to 5635, 5641 to 5645, 5651 to 5655, 5661 to 5665, 5671 to 5675, and 5681 to 5685) each having two inputs and one output. The eight unit optical switch elements 5511, 5512, 5513, 5514, 5515, 5516, 5517, and 5518 are connected in a vertical line, and further, the gate optical switch elements 5711 to 5718 for improving an extinction ratio are connected to the output ports of the respective unit optical switch elements, which forms an optical switch 511 of one input and eight outputs (the code is not illustrated in the figure). Similarly the unit optical switch elements 5521 to 5528, 5531 to 5538, 5541 to 5548, 5551 to 5558, and 3561 to 3568 are respectively connected in a vertical line, and the gate optical switch elements 5721 to 5728, 5731 to 5738, 5741 to 5748, 5751 to 5758, and 5761 to 5768 are connected to the output ports of the respective unit optical switch elements, which form optical switches 512, 513, 514, 515, and 516 (the code is not illustrated in the figure) each having one input and eight outputs.

The five unit optical combining elements 5611, 5612, 5613, 5614, and 5615 are connected in a vertical line, which forms an optical combining device 531 of six inputs and one output (the code is not illustrated in the figure). Similarly the unit optical combining elements 5621 to 5625, 5631 to 5635, 5641 to 5645, 5651 to 5655, 5661 to 5665, 5671 to 5675, and 5681 to 5685 are respectively connected in a vertical line, which form optical combining devices 532, 533, 534, 535, 536, 537, and 538 each having six inputs and one output.

Herein for making each ratio of optical powers combining from each of six input ports to one output port in the optical combining device 531 equal, each combining optical power ratio of the unit optical combining elements 5611, 5612, 5613, 5614, and 5615 is set as 1:1, 2:1, 3:1, 4:1, and 5:1. It is apparent that the combining optical power ratio is set in the order of 1:1, 2:1, and (M−1):1 from the unit optical combining element closer to the input of the matrix optical switch. For obtaining this combining optical power ratio, a directional coupler, an asymmetrical Y branch and the like can be used as the unit optical combining element. One of the two input ports in the unit optical combining element 5612, which has a larger combining optical power ratio, is connected to the output port in the unit optical combining element 5611. One of the two input ports in the unit optical combining element 5613, which has a larger combining optical power ratio, is connected to the output port in the unit optical combining element 5612. Hereinafter, similarly one of the two input ports in each of the unit optical combining elements 5614 and 5615, which has a larger combining optical power ratio, is connected to the output port in each of the unit optical combining elements 5613 and 5614.

The same configuration is applied to the unit optical combining elements 5621 to 5625, 5631 to 5635, 5641 to 5645, 5651 to 5655, 5661 to 5665, 5671 to 5675, and 5681 to 5685 forming the optical combining devices 532 to 538.

The respective inputs in the optical switches 511 to 516 are connected to six external input ports 501 to 506, and the respective outputs of the optical combining devices 531 to 538 are connected to external output ports 541 to 548.

In the matrix optical switch shown in FIG. 5, the output port in the gate optical switch element 5711 included in the optical switch 511 is connected to the input port in the unit optical combining element 5621. In addition, the unit optical combining element 5641 is arranged immediately after the gate optical switch element 5712, and the output port in the gate optical switch element 5712 and the input port in the unit optical combining element 5641 are connected without the intersection with the other route. Similarly the output port in the gate optical switch element 5713 and the input port in the unit optical combining element 5662, the output port in the gate optical switch element 5714 and the input port in the unit optical combining element 5682, the output port in the gate optical switch element 5715 and the input port in the unit optical combining element 5672, the output port in the gate optical switch element 5716 and the input port in the unit optical combining element 5653, the output port in the gate optical switch element 5717 and the input port in the unit optical combining element 5634, and the output port in the gate optical switch element 5718 and the input port in the unit optical combining element 5615 are respectively connected without the intersection with the other route.

The output port in the gate optical switch element 5721 included in the optical switch 512 is connected to the input port in the unit optical combining element 5611. In addition, the unit optical combining element 5621 is arranged immediately after the gate optical switch element 5722, and the output port in the gate optical switch element 5722 and the input port in the unit optical combining element 5621 are connected without the intersection with the other route. Similarly the output port in the gate optical switch element 5723 and the input port in the unit optical combining element 5642, the output port in the gate optical switch element 5724 and the input port in the unit optical combining element 5663, the output port in the gate optical switch element 5725 and the input port in the unit optical combining element 5683, the output port in the gate optical switch element 5726 and the input port in the unit optical combining element 5673, the output port in the gate optical switch element 5727 and the input port in the unit optical combining element 5654, the output port in the gate optical switch element 5728 and the input port in the unit optical combining element 5635 are respectively connected without the intersection with the other route.

Hereinafter, similarly eight output ports in the optical switches 513 to 516 are respectively connected to the unit optical combining elements.

According to this configuration, the output port of each optical switch does not combine in the optical combining device after the intersection, but intersects after combining in the unit optical combining element. Therefore the number of the intersections in an entire matrix optical switch can be reduced. Actually in the optical switch in FIG. 5, the number of the intersections in one route is 11 locations at most.

It should be noted that in FIG. 5, the unit optical switch elements 5518, 5528, 5538, 5548, 5558, and 5568 each having one input and two outputs, each of which is illustrated as one input and one output by omitting one output, and the gate optical switch elements are arranged for enhancing an extinction ratio, and the present invention can perform a basic operation without them. The unit optical switch element and the gate optical switch element have the effect for enhancing the extinction ratio of the matrix optical switch even if the extinction ratio of the unit optical switch element of one input and two outputs is insufficient.

In addition, in the fifth embodiment, even if the external input port is reversed to the external output port and the external output port is reversed to the external input port in the matrix optical switch, the optical combining device is reversed to the optical branching device, and the unit optical combining element is reversed to the unit optical branching element, it is apparent that the number of the intersections in the entire matrix optical switch can similarly be reduced.

Sixth Embodiment

The matrix optical switch according to the present invention can be used independently as explained above, but may be configured by a combination of a plurality of matrix optical switches.

Figure 6:
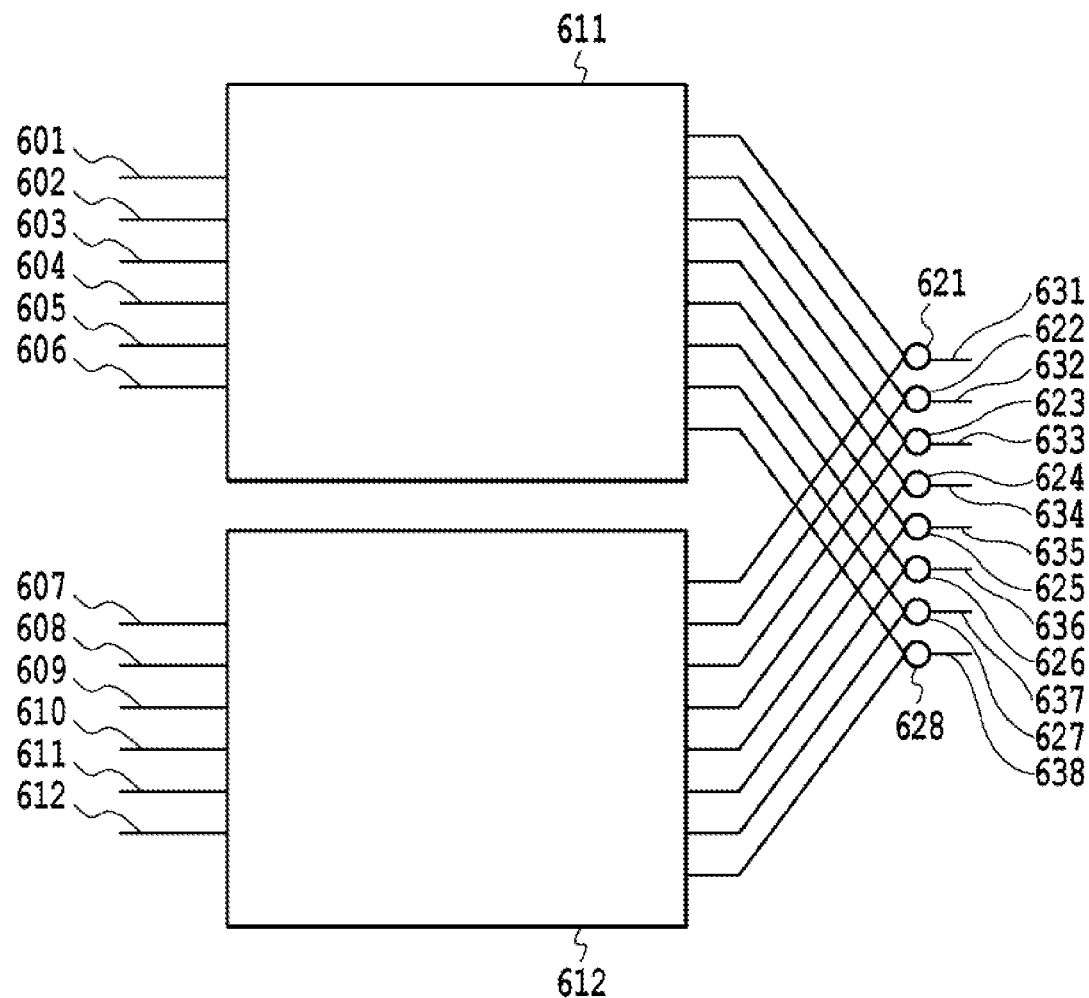
FIG. 6 is an explanatory diagram showing a circuit configuration of a matrix optical switch of twelve inputs and eight outputs according to a sixth embodiment in the present invention.

FIG. 6 is an explanatory diagram showing a sixth embodiment in the present invention, and shows an example in which two matrix optical switches each having six inputs and eight outputs according to the fifth embodiment are combined to configure a matrix optical switch of 12 inputs and eight outputs.

The matrix optical switch shown in FIG. 6 comprises two matrix optical switches (611 and 612) each having six inputs and eight outputs, and eight optical combining devices 621 to 628 each having two inputs and one output, and each combining optical power ratio of the optical combining devices 621 to 628 is 1:1.

One of the two input ports in the first unit optical combining device 621 is connected to the first output out of the eight output ports in the matrix optical switch 611, and the other of the two input ports in the optical combining device 621 is connected to the first output out of the eight output ports in the matrix optical switch 612.

In addition, one of the two input ports in the second unit optical combining device 622 is connected to the second output ports out of the eight output ports in the matrix optical switch 611, and the other of the two input ports in the unit optical combining device 622 is connected to the second output ports out of the eight output ports in the matrix optical switch 612.

Hereinafter, similarly one of the two input ports in each of the third to eighth optical combining devices 623 to 628 is connected to each of the third to eighth output ports out of the eight output ports in the matrix optical switch 611, and the other of the two input ports in each of the unit optical combining devices 623 to 628 is connected to each of the third to eighth output ports out of the eight output ports in the matrix optical switch 612.

As shown in FIG. 6, a case where the two matrix optical switches each having six inputs and eight outputs are combined to configure the matrix optical switch, as compared to a case where the matrix optical switch of 12 inputs and eight outputs is configured independently, has an advantage that although many intersections are generated between the matrix optical switches 611 and 612, and the optical combining devices 621 to 628 each having two inputs and one output, but it is possible to suppress an increase on kinds of the optical combining device. In a case where the matrix optical switch of 12 inputs and eight outputs is configured independently, 11 kinds of optical combining devices in which the combining optical power ratio is 1:1, 1:2, . . . , 1:11 are necessary. However, as shown in FIG. 6, in a case where the two matrix optical switches each having six inputs and eight outputs are combined to configure the matrix optical switch, the required kinds of the optical combining device are only five kinds in each of which the combining optical power ratio is 1:1, 1:2, . . . , 1:5.

REFERENCE SIGNS LIST

101 to 104: External input port
111 to 114: Optical switch of one input and four outputs
121: Intersection part
131 to 134: Optical combining device of four inputs and one output
141 to 144: External output port
201 to 204: External input port
211 to 214: Optical switch of one input and four outputs
231 to 234: Optical combining device of four inputs and one output
241 to 244: External output port
2511 to 2514, 2521 to 2524, 2531 to 2534, and 2541 to 2544: Unit optical switch element of one input and two outputs
2611 to 2613, 2621 to 2523, 2631 to 6533, and 2641 to 2643: Unit optical combining element of two inputs and one output
301 to 308: External input port
311 to 318: Optical switch of one input and eight outputs
331 to 338: Optical combining device of eight inputs and one output
341 to 348: External output port
3511 to 3518, 3521 to 3528, 3531 to 3538, 3541 to 3548, 3551 to 3558, 3561 to 3568, 3571 to 3578, and 3581 to 3588: Unit optical switch element of one input and two outputs
3611 to 3617, 3621 to 3627, 3631 to 3637, 3641 to 3647, 3651 to 3657, 3661 to 3667, 3671 to 3677, and 3681 to 3687: Unit optical combining element of two inputs and one output
3711 to 3718, 3721 to 3728, 3731 to 3738, 3741 to 3748, 3751 to 3758, 3671 to 3768, 3771 to 3778, and 3781 to 3788: Gate optical switch element of one input and one output
401, 402: Input port
411, 412: Output port
41: Silicon substrate 42: Clad layer
431, 432: Embedded core portion
441, 442: Thin-film heater
451, 452, 453: Heat-Insulating groove
461, 462: Directional coupler
501 to 506: External input port
511 to 516: Optical switch of one input and eight outputs
531 to 538: Optical combining device of six inputs and one output
541 to 548: External output port
5511 to 5518, 5521 to 5528, 5531 to 5538, 5541 to 5548, 5551 to 5558, and 5561 to 5568: Unit optical switch element of one input and two outputs
5611 to 5615, 5621 to 5625, 5631 to 5635, 5641 to 5645, 5651 to 5655, 5661 to 5665, 5671 to 5675, and 5681 to 5685: Unit optical combining element of two inputs and one output
5711 to 5718, 5721 to 5728, 5731 to 5738, 5741 to 5748, 5751 to 5758, and 5661 to 5768: Gate optical switch element of one input and one output
601 to 612: External input port
611, 612: Optical switch of six inputs and eight outputs
621 to 628: Optical combining device of two inputs and one output
631 to 638: External output port

The invention claimed is:

1. A waveguide type optical switch having a form of a matrix optical switch of M inputs and N outputs formed on a single substrate, where M and N are integers different from each other, M and N each having a value greater than or equal to three, the matrix optical switch comprising:
M optical switches each having one input and N outputs; and
N optical combining devices each having M inputs and one output, wherein
the a-th input of the matrix optical switch is the input of the a-th optical switch, where a is an integer from 1 to M,
the b-th output of the matrix optical switch is the output of the b-th optical combining device, where b is an integer from 1 to N,
each of the optical switches consists of N−1 unit optical switch elements each having one input and two outputs, and
each of the optical combining devices consists of M−1 unit optical combining elements each having two inputs and one output,
wherein for each optical switch,
the input of the first unit optical switch element forms the input of the optical switch,
one of the outputs of the i-th unit optical switch element is connected to the input of the (i+1)-th unit optical switch element, where i is an integer from 1 to N−2,
the other of the outputs of the i-th unit optical switch element forms the i-th output of the optical switch, and
the two outputs of the (N−1)-th unit optical switch element form the (N−1)-th output and the N-th output of the optical switch,
wherein for each optical combining device,
the two inputs of the first unit optical combining element form the first and second inputs of the optical combining device,
one of the inputs of the j-th unit optical combining element is connected to the output of the (j−1)-th unit optical combining element, where j is an integer from 2 to M−1,
the other of the inputs of the j-th unit optical combining element forms the (j+1)-th input of the optical combining device, and
the output of the (M−1)-th unit optical combining element forms the output of the optical combining device,
wherein in the matrix optical switch,
the p-th optical switch and the q-th optical combining device are connected between any output in the p-th optical switch and any input in the q-th optical combining device, where p is an integer from 1 to M and q is an integer from 1 to N,
wherein
in a case where any output in the p-th optical switch is the k-th output in the connection, any input in the q-th optical combining device is the k'-th input, k being an integer from 1 to N and k' being an integer from 1 to M, and
in a case where k is from 2 to N−1 in the connection, a waveguide intersection is not included in the connection between the output of the unit optical switch element forming the k-th output in the p-th optical switch and the input of the unit optical combining element forming the k'-th input in the q-th optical combining device.

2. A waveguide type optical switch according to claim 1, wherein
for each optical combining device, each unit optical combining element includes two input terminals, and a combining optical power ratio between the two input terminals of the first unit optical combining element is 1:1, and
a combining optical power ratio between an input terminal connected to the output of the optical switch in the j-th unit optical combining element and an input terminal connected to the other unit optical combining element is 1:j where j is an integer from 2 to M−1.

3. A waveguide type optical switch having a form of a matrix optical switch of N inputs and M outputs formed on a single substrate, where M and N are integers different from each other, M and N each having a value greater than or equal to three, the matrix optical switch comprising:
N optical branching devices each having one input and M outputs; and
M optical switches each having N inputs and one output, wherein
the a-th input of the matrix optical switch consists of the input of the a-th optical branching device, where a is an integer from 1 to N,
the b-th output of the matrix optical switch consists of the output of the b-th optical switch, where b is an integer from 1 to M,
each of the optical branching devices consists of M−1 unit optical branching elements each having one input and two outputs, and
each of the optical switches consists of N−1 unit optical switch elements each having two inputs and one output,
wherein for each optical branching device,
the input of the first unit optical branching element forms the input of the optical branching device,
one of the outputs of the i-th unit optical branching element is connected to the input of the (i+1)-th unit optical branching element, where i is an integer from 1 to M−2, the other of the outputs of the i-th unit optical branching element forms the i-th output of the optical branching device, and two outputs of the (M−1)-th unit optical branching element form the (M−1)-th output and the M-th output of the optical branching device, wherein for each optical switch, two inputs of the first unit optical switch element form the first and second inputs of the optical switch, one of the inputs of the j-th unit optical switch element is connected to the output of the (j−1)-th unit optical switch element, where i is an integer from 2 to N−1, the other of the inputs of the j-th unit optical switch element forms the (j+1)-th input of the optical switch, and the output of the (N−1)-th unit optical switch element forms the output of the optical switch, wherein in the matrix optical switch, the p-th optical branching device and the q-th optical switch are connected between any output in the p-th optical branching device and any input in the q-th optical switch, where p is an integer from 1 to N and q is an integer from 1 to M, wherein in a case where any output in the p-th optical branching device is the k-th output in the connection, where k is an integer from 1 to M, any input in the q-th optical switch is the k'-th input, where k' is an integer from 1 to M, and in a case where k is from 2 to M−1 in the connection, a waveguide intersection is not included in the connection between the output in the unit optical branching element forming the k-th output in the p-th optical branching device and the input in the unit optical switch element forming the k'-th input in the q-th optical switch.

4. A waveguide type optical switch according to claim 3, wherein for each optical branching device, each unit optical combining element includes two input terminals, and a branching optical power ratio between the two output terminals of the (M−1)-th unit optical branching element in the optical branching device is 1:1, and a branching optical power ratio between an output terminal connected to the input in the optical switch of the i-th unit optical branching element and an output terminal connected to the other unit optical branching element is 1:(M−i), where i is an integer from 1 to M−2.

* * * * *